United States Patent [19]

Stewart et al.

[11] Patent Number: 5,219,151

[45] Date of Patent: Jun. 15, 1993

[54] FLOATING LEAF SPRING SEPARATOR PAD AND METHOD FOR INSTALLING SAME

[75] Inventors: Hall Stewart, Huntsville; William L. Dawson, Caddo Mills, both of Tex.

[73] Assignee: Power Shield Corporation, Rockwall, Tex.

[21] Appl. No.: 745,606

[22] Filed: Aug. 15, 1991

Related U.S. Application Data

[63] Continuation-in-part of Ser. No. 497,197, Mar. 22, 1990, abandoned.

[51] Int. Cl.⁵ ............................................ B60G 11/107
[52] U.S. Cl. .................................... 267/262; 267/268
[58] Field of Search ............... 267/260, 262, 268, 269, 267/270; 280/699, 718

[56] References Cited

U.S. PATENT DOCUMENTS

| | | | |
|---|---|---|---|
| Re. 23,252 | 8/1950 | Frazier | 280/104.5 |
| 2,127,077 | 8/1938 | Yates | 267/262 |
| 2,337,073 | 12/1943 | Townsend | 267/268 |
| 2,577,322 | 12/1951 | Frazier | 280/104.5 |
| 2,649,296 | 8/1953 | Dow | 267/49 |
| 2,667,347 | 1/1954 | Jacobs | 267/37.2 |
| 2,735,672 | 2/1956 | Bradley | 267/49 |
| 2,801,100 | 7/1957 | Crites | 267/49 |
| 2,983,504 | 5/1961 | Rueter et al. | 267/262 |
| 3,159,389 | 12/1964 | Clary | 267/50 |
| 3,195,876 | 7/1965 | Tea | 267/52 |
| 3,218,054 | 11/1965 | Nallinger | 267/268 |
| 3,305,231 | 2/1967 | Boughner et al. | 267/52 |
| 4,750,718 | 6/1988 | Nickel | 267/49 |

Primary Examiner—Robert J. Oberleitner
Assistant Examiner—Peter M. Poon
Attorney, Agent, or Firm—Pravel, Hewitt, Kimball & Krieger

[57] ABSTRACT

A separator pad is loosely positioned between a leaf spring end and a top wall of a mounting slot in a vehicle spring hanger. The separator pad is preferably slid between the spring end and the slot top wall when the load on the leaf spring is relaxed or removed. The separator pad is positioned relative to the spring hanger while the load is relaxed to allow for limited subsequent longitudinal movement of the pad when the load is reapplied and the vehicle is in use. The separator pad includes stop members thereon at opposite ends thereof respectively to engage the spring hanger or the spring end and limit further longitudinal pad movement in that direction before the pad falls out.

23 Claims, 2 Drawing Sheets

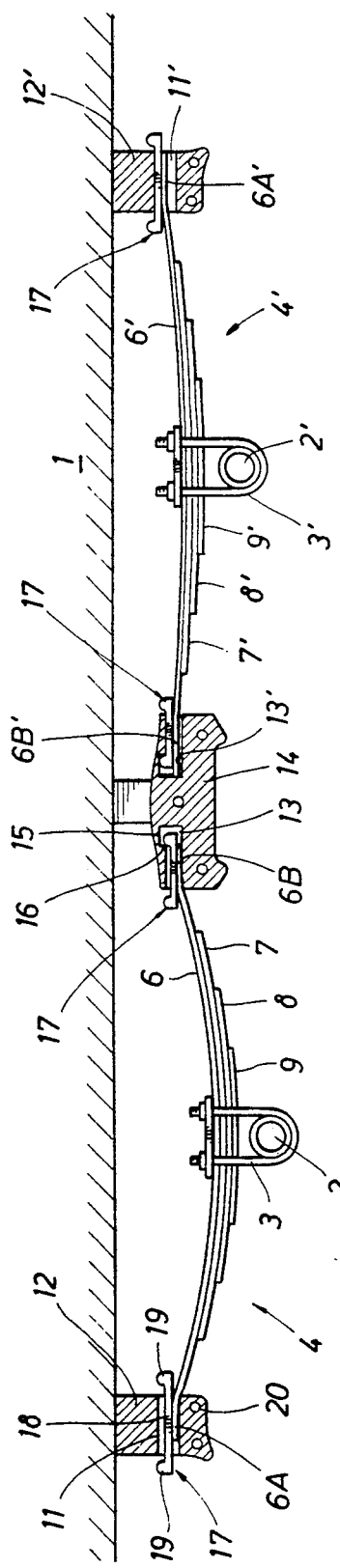
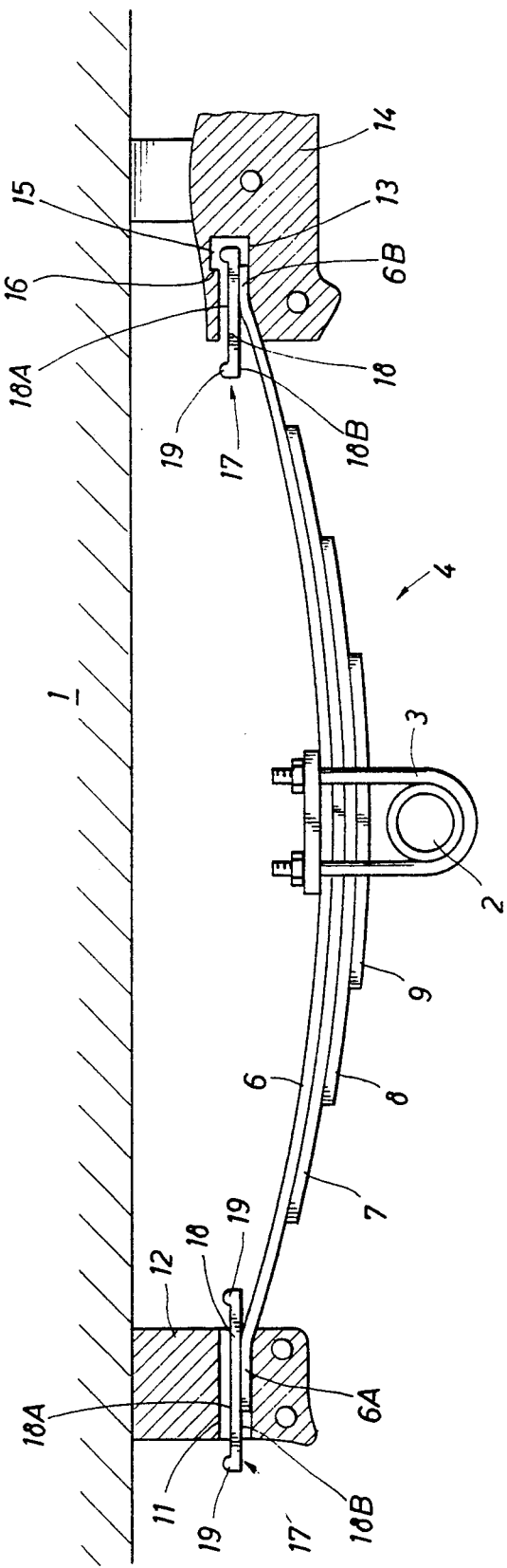

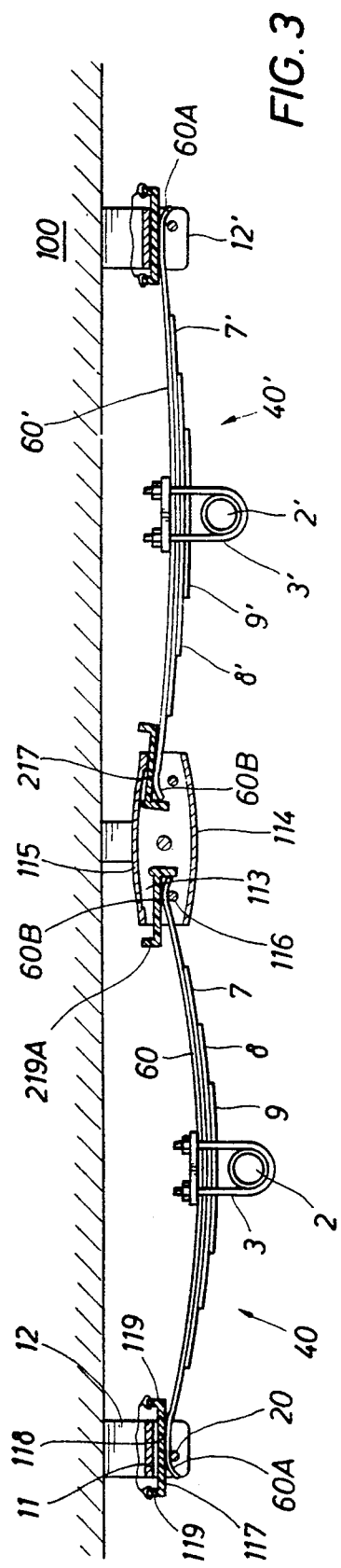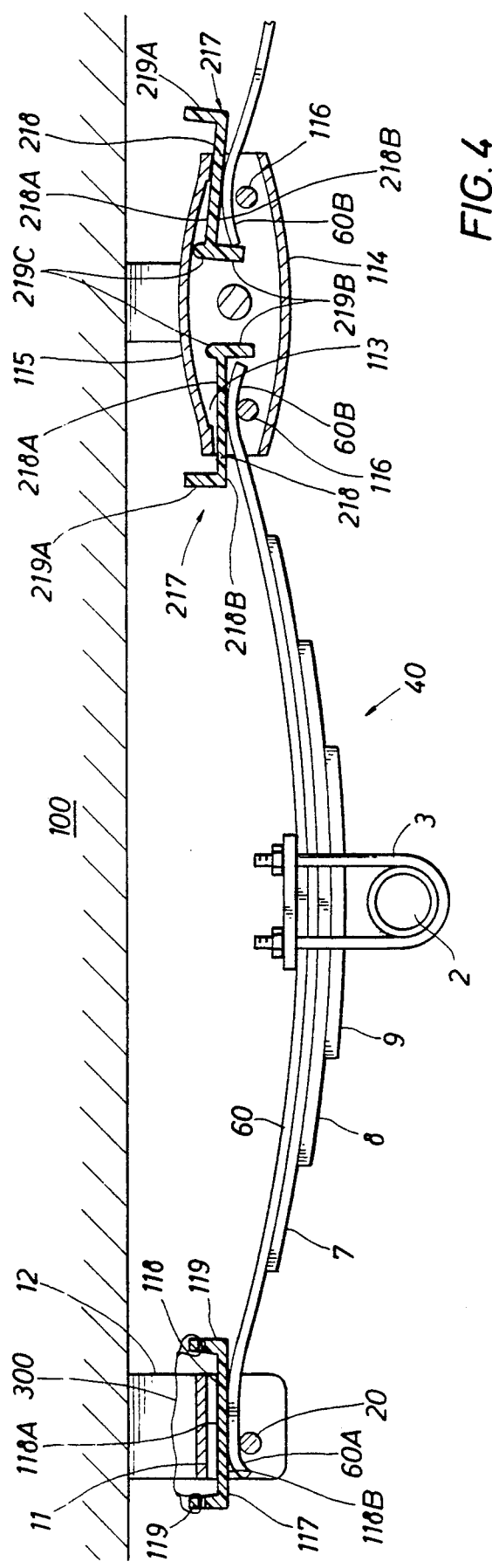

FLOATING LEAF SPRING SEPARATOR PAD AND METHOD FOR INSTALLING SAME

This application is a continuation-in-part of U.S. patent application Ser. No. 497,197, filed Mar. 22, 1990 now abandoned. One of the inventors listed in the present application is the sole named inventor in application Ser. No. 497,197.

BACKGROUND OF THE INVENTION

1. Field of the Invention

The present invention relates in general to a leaf spring assembly used for mounting a vehicle axle to a vehicle frame and in particular to a pad or separator loosely positioned between the end of the leaf spring assembly and a spring hanger to improve wear and ride characteristics and a method for installing the pad.

2. Description of the Prior Art

Laminated leaf spring assemblies for mounting vehicle axles to the vehicle frame are well known in the art. The conventional leaf spring assembly used in vehicles of various types is ordinarily securely attached at each leaf spring end to a spring hanger attached to the vehicle frame. The spring assembly forms a sliding fit with the spring hanger at one or both ends of the spring assembly. The spring assembly must be permitted to change shape and length as the load on the spring assembly changes. As the load on the leaf spring changes and the end or ends of the leaf spring slides through the spring hangers, the end surfaces of the leaf spring rub against the surface of the spring hangers resulting in repeated wear and tear of the contacting surfaces of the leaf spring and/or the spring hangers. Additional wear and tear results between the individual leaf spring members. Pads or separators have been used between the individual leaf spring members and between the leaf spring ends and the spring hangers.

With respect to pads or separators positioned between individual leaf spring members of the laminated leaf spring assembly, reference may be had to U.S. Pat. Nos. 2,801,100; 3,159,389; 3,195,876; 4,750,718; 3,305,231; and 2,649,296. The separator pads or layers between the respective leaf spring members in the noted patents are made from a variety of different materials including polyethylene, rubber, polyester elastomers, Delrin and Nylon. These pads extend along the lengths of the respective leaf spring members but are not positioned at the ends of the leaf spring assembly.

With respect to pads between the end of the leaf spring assembly and the spring hanger, reference may be had to U.S. Pat. No. 2,983,504 to Reuter and U.S. Pat. Nos. Re 23,252 and 2,577,322 to Frazier. The pad in the Reuter patent is made from polyester reinforced with an embedded metal plate. The Reuter pad is rigidly bolted to the spring hanger and would thus have to be installed either as original equipment or after the spring assembly has been completely removed from its mounting. The Frazier patents disclose wear plates of rubber or similar material bolted to the spring hanger. Thus, the wear plates in the Frazier patent are rigidly mounted and must be installed either as original equipment or with the spring assembly completely removed from the spring hanger. If not installed as original equipment, the installation of the prior art pads between the end of the leaf spring assembly and the spring hanger is labor intensive and costly. If the installation is too labor intensive and costly, the operator may decide that the pads are not necessary or cost effective.

Accordingly, there exists a need for a pad or separator which can be quickly, easily, and cheaply installed on existing vehicles without the necessity of removing the spring assembly from the spring hanger and without being rigidly attached to the spring hanger. Furthermore, the pad should lubricate the end of the spring assembly to minimize squeaking and wear.

SUMMARY OF THE PRESENT INVENTION

The present invention is directed to a separator pad positioned between the leaf spring end and the top wall of a spring hanger slot to improve the wear and ride characteristics of a vehicle. The separator pad is made from plastic and is permitted to "float" or move for limited longitudinal distances along the spring end when the vehicle is being operated.

The plastic separator pad is configured to provide this limited freedom of longitudinal movement without dislocating from between the leaf spring and the spring hanger. For this purpose, the separator pad includes stop lips adjacent each end thereof to engage the spring hanger and preclude further longitudinal movement in that direction before the separator pad falls off and dislocates. Similarly, the side edges of the separator pads may have guide flanges or the like extending downwardly therefrom to embrace opposite sides of the leaf spring to laterally retain that separator pad on the leaf spring. These side guide flanges are not necessary if the spring hanger captures or frictionally engages both sides of the leaf spring end and separator pad.

The plastic separator pad is inserted when the load is removed or relaxed from the leaf spring assembly. In one embodiment of the invention, by removing the vehicle load from the leaf spring assembly sufficient clearance is provided between the leaf spring end and the top wall of the hanger slot to allow the separator pad to be forcibly slid into place and properly positioned relative to the spring hanger and the leaf spring. The vehicle load is then reapplied on the leaf spring to capture and contain the separator pad between the leaf spring end and the top wall of the slot in the spring hanger.

In the second and third embodiments of the invention, the separator pads include flanges at each end of the separator pad to engage the spring hanger and permit limited longitudinal movement of the separator pad. To install the separator pads of the second and third embodiments the vehicle load is removed from the leaf spring assembly and a spring retainer bolt is removed. This allows the end of the leaf spring to be lowered just enough to provide sufficient clearance between the leaf spring end and the top wall of the spring hanger to insert the separator pad into the spring hanger. The leaf spring end is then raised back to its original position and the retainer bolt is replaced. The vehicle load is then reapplied on the leaf spring to capture and contain the separator pad between the leaf spring end and the top wall of the slot in the spring hanger.

These and other objects and advantages of the present invention will become apparent as the following description proceeds.

BRIEF DESCRIPTION OF THE DRAWINGS

A better understanding of the present invention may be had by reference to the following drawings and contained numerals therein of which:

FIG. 1 is a side elevation view showing a tandem axle configuration utilizing the separator pads of a first embodiment of the present invention between the respective leaf spring ends and the upper walls of the spring hanger slots, the left leaf spring assembly being unloaded and the right leaf spring assembly being loaded;

FIG. 2 is an enlarged side elevation view of the left leaf spring assembly of FIG. 1;

FIG. 3 is a side elevation view showing a tandem axle configuration utilizing the separator pads of the second and third embodiments of the present invention between the respective leaf spring ends and the upper walls of the spring hanger slots, the left leaf spring assembly being unloaded and the right leaf spring assembly being loaded; and FIG. 4 is an enlarged side elevation view of the left leaf spring assembly and a portion of the right leaf spring assembly of FIG. 3.

DETAILED DESCRIPTION OF THE INVENTION

The separator pad of the present invention can be used on any type of vehicle using a leaf spring assembly for mounting an axle to a frame of a vehicle. As used herein, the term "vehicle" shall mean any style or size of car, truck, van, bus, railroad car and/or trailer.

Referring to FIG. i, a vehicle 1 is shown at least partially supported by a tandem axle arrangement. It is to be understood that the present invention may also be used with vehicles having a single axle arrangement. The first or left axle 2 is rotatably mounted in an axle housing, suspended from a U-bolt assembly 3 connected to and extending downwardly from a laminated leaf spring assembly 4. The leaf spring assembly 4 includes a main bowed spring leaf 6 and a plurality of individual leaf numbers 7, 8, 9 of decreasing length laminated therebelow and connected thereto The present invention may also be used with a solid, one piece type leaf spring.

It should be noted in FIG. 1 that components which are structurally and functionally identical but relate to different axles have been identified with the same reference numerals followed by a prime (') designation. Thus, the right axle 2' and right leaf spring assembly 4' are structurally and functionally identical to the left axle 2 and left leaf spring assembly 4. As shown in FIG. 1, the left leaf spring assembly 4 is more bowed than the right leaf spring assembly 4' because it is under no downward load as is the case where the weight of the vehicle 1 has been relaxed or removed from the leaf spring assembly by jacking up the frame of the vehicle 1.

As shown in FIGS. 1 and 2, the opposite ends of the main spring leaf 6 are bent into substantially horizontal orientation to form generally flat spring leaf ends 6A and 6B. Spring end 6A is received in a slot 11 in a left spring hanger 12. Left spring hanger 12 is connected to and extends downwardly from the frame of the vehicle 1. Typically, the width of the slot 11 is substantially equal to or slightly greater than the width of the spring end 6A to restrain the lateral movement thereof. The left spring end 6A of the main spring leaf 6 extends well along the length of the slot 11. The left spring hanger 12 includes a retainer pin or bolt 20 which retains the spring end 6A in the slot 11 when the downward load has been removed from the left leaf spring assembly 4.

The right spring end 6B of the main spring leaf 6 is received in a blind end slot 13 in a main or central spring hanger 14. Although in FIGS. 1 and 2, the blind end slot 13 is illustrated in the central spring hanger 14, it will be appreciated that a straight through slot or a pivot spring hanger could also be used. The inner end of the blind end slot 13 is provided with an enlarged compartment or keyway 15 defining an internal shoulder 16. The central spring hanger 14 is connected to and extends downwardly from the frame of the vehicle 1. Typically, the width of the blind end slot 13 is substantially equal to or just slightly greater than the width of the spring end 6B, thereby restraining lateral movement of the spring end 6B. The spring end 6B extends well along the length of the blind end slot 13, although sufficient clearance is provided at the end thereof for longitudinal movement resulting from the leaf spring assembly 4 spreading under application of a load to the spring assembly.

As illustrated in FIG. 1, when the weight of the vehicle 1 is applied to the right spring assembly 4', the spring assembly 4' is flexed upwardly. This causes the spring ends 6A' and 6B' of main leaf spring 6' to also move upwardly within their respective slots 11' and 13' and to spread longitudinally apart. These spring ends 6A' and 6B' will not come out of their respective slots 11' and 13' under any load conditions because of the dimensional parameters selected including the length of the main spring 6', the length and height of the hanger slots 11' and 13', the stiffness of the spring assembly 4' and the distance between the right spring hanger 12' and the central spring hanger 14.

Variations in the load applied to the spring assemblies 4 and 4' will result in repeated metal-to-metal contact between the main springs 6 and 6' and the spring hangers 12, 12' and 14 causing wear and a roughness in ride unless pads are utilized. To minimize this wear and provide a smoother ride, a separator pad, indicated generally at 17, is positioned between the spring ends 6A and 6B and the upper walls of the respective hanger slots 11 and 13. The same is true for the spring ends 6A' and 6B' and the upper walls of the hanger slots 11' and 13'.

The separator pad 17 can be made of any suitable plastic material having low flow characteristics under high pressure and a low co-efficient of friction. For example, plastics such as polyethylene, polyurethane, urethane, Teflon and Nylon are suitable for this purpose. Additionally, the plastic material should be lightweight and able to absorb and withstand tremendous impact shocks and shearing forces while exhibiting excellent vibration absorption and dissipation characteristics. A preferred material is MAXITE™, available from C-L Resins, Groveton, Tex. The preferred material, MAXITE™, will not oxidize and is unaffected by corrosive road chemicals. Furthermore, MAXITE™ contains molybdenum disulfide which provides an ingenious "dry" lubricating surface which effectively prevents wear between the spring ends 6A and 6B and the spring hangers 12 and 14.

As shown in FIGS. 1 and 2, a first embodiment of the separator pad 17 includes a main body 18 having integrally formed, upwardly projecting stop lips 19 at or adjacent each end thereof. The main body 18 has generally planar, smooth upper and lower surfaces 18A and 18B respectively. The stop lips 19 extend upwardly from the upper surface 18A of the separator pad 17. As shown in FIGS. 1 and 2, the stop lips 19 are generally semi-circular in cross-section, although other shapes could be used.

The separator pad 17 is positioned at each end 6A and 6B of the left leaf spring assembly 4 and at each end 6A' and 6B' of the right leaf spring assembly 4'. The separator pads 17 are installed by placing the separator pad 17 between the spring end 6A and top wall of the hanger slot 11 when the load has been removed from the leaf spring assembly 4. At the opposite end 6B of the spring assembly 4, the separator pad 17 is placed between the spring end 6B and the top wall of the blind end slot 13 of the central hanger 14.

As shown in FIG. 1, the spring assembly 4 on the left side of FIG. 1 has the load removed therefrom, while the tandem leaf spring assembly 4' on the right side of FIG. 1 has a load applied thereto For the purpose of installing the separator pads 17, the vehicle 1 can be positioned by a step or curb where the tires (not shown) carried by the right axle 2' are in a ground contact position while the tires carried by the left axle 2 are elevated above the ground to relieve or relax the load on the left spring assembly 4. Alternatively, the load can be relieved by using a ramp or jack. With the load relieved, the left spring end 6A bears against the bottom wall of slot 11 in the left spring hanger 12, and the right spring end 6B bears against the bottom wall of the blind end slot 13 in the main hanger 14. With the spring ends 6A and 6B in such position, clearance exists between the spring ends 6A, 6B and the top walls of the respective slots 11, 13. This clearance allows the plastic separator pads 17 to be forcibly slid into position between the spring ends 6A, 6B and the top wall of the slots 11, 13 in the respective hangers 12, 14. Preferably, the height of the stop lip 19 and the main body 18 should equal or slightly exceed the amount of clearance between the spring end and the top wall of the slot so that the pad 17 can be forcibly driven in place and will remain in place during use.

Referring to the left spring hanger 12, the plastic separator pad 17 is forcibly slid into position with the load relaxed from the spring assembly 4 until the spaced end stop lips 19 are positioned outside the spring hanger 12 on opposite sides thereof. The length of the plastic separator pad 17 is selected so that some clearance is provided between the stop lips 19 and the opposite sides of the spring hanger 12 adjacent the entrance to the slot 11. This length of separator pad 17 and positioning of the stop lips 19 provides clearance for some limited movement of the separator pad 17 longitudinally along the spring end 6A during vehicle operation.

Similarly, at the central or main hanger 14, with the load on the spring assembly 4 relieved, a clearance exists between the right spring end 6B and the top wall of the blind end slot 13. The separator pad 17 is forcibly slid into position within this clearance until the inner stop lip 19 thereof is received within the keyway 15 past the shoulder 16. The length of the separator pad 17 for the central hanger 14 is selected to provide longitudinal spaces between the stop lip 19 and the shoulder 16 at the inner end and between the other stop lip 19 and the outer side of the central hanger 14 at the exposed end. This length of the separator pad 17 and the relative positioning of the spaced stop lips 19 provide for some longitudinal movement of this separator pad 17 when the vehicle is in operation.

For this purpose, when the load is reapplied to the left spring assembly 4, it will look like the right spring assembly 4' as shown in FIG. 1. The spring assembly 4' flexes upwardly with the spring ends 6A' and 6B' also being moved upwardly and being spread longitudinally outwardly to accommodate the deflection The spring ends 6A' and 6B' thus force the inserted separator pads 17 into contact with the upper walls of the hanger slots 11', 13'. However, these separator pads 17 are not held rigidly in place and have some longitudinal freedom of movement within the slots 13', 11'. It has been found that the longitudinal freedom of movement of the separator pad 17 is vital to minimizing the wear and extending the life of the separator pad 17.

In this regard, as the load on the leaf spring assemblies 4, 4' varies in operation, the pads 17 may move slightly in either longitudinal direction. This movement will be limited if the separator pad 17 reaches a point where a stop lip 19 thereon engages the hanger adjacent the slot 11, 13 or engages a shoulder 16 within the slot 13. This stop lip 19 engagement precludes further longitudinal separator pad 17 movement and retains the separator pad 17 in position.

As illustrated, the slot 11, 13 in the hanger 12, 14 has a width substantially equal to or just slightly greater than the width of the main leaf spring 6. The separator pad 17 also has a width substantially equal to the width of the main leaf spring 6 and the width of the slot 11, 13 to be laterally restrained within its proper position. If the hanger slot 11, 13 receiving the spring end 6A, 6B is considerably wider than the spring end 6A, 6B, the separator pad 17 may be provided with retention means to restrain lateral movement. The retention means can take many forms including downwardly depending guide flanges at each side of the separator pad 17. These downwardly extending guide flanges embrace the sides of the spring ends 6A, 6B to provide lateral stability and mounting for the separator pads 17. The downwardly depending side flanges also guide the separator pads 17 along the spring ends 6A, 6B during any relative longitudinal movement therebetween. A separator pad 17 could be provided having a slot or bore (not shown) through its entire body length to receive the end of the spring if desired for lateral dimensional stability and for top and bottom metal encapsulation. However, such a separator pad 17 with a full length slot or bore is more difficult to mount and requires greater space.

The separator pad 17 may be easily field installed and is loosely but firmly held in place between the spring end 6A, 6B and the hanger slot 11, 13. The use of a curb or step to relieve the load on the laminated leaf spring assembly 4 permits the separator pad 17 to be easily slid into its proper position without specialized tools or jack equipment. The separator pad 17, by being positioned between the spring end 6A, 6B and hanger slot 11, 13 reduces wear on those respective parts by eliminating or minimizing harsh metal-to-metal contact. The separator pads 17 greatly reduce wear on leaf springs 4, 4' and spring hangers 12, 12' and 14 by allowing the spring ends 6A and 6B to slide across the separator pads 17. The upper surface 18A of the separator pad 17 slidably engages the upper wall of the slot 11, 13 while the lower surface 18B slidably engages the spring end 6A, 6B. Moreover, the position of the separator pad 17 between the spring end 6A, 6B and the hanger slot 11, 13 provides a smoother or more cushioned ride providing additional comfort to vehicle occupants. The lubricity of the plastic material used to make the separator pads 17 contributes to the improved ride and enhances the ability of the separator pads 17 to longitudinally adjust relative to the spring assembly and slot in response to jolts or shocks.

Referring now to FIGS. 3 and 4, a second and third embodiment of a separator pad of the present invention is shown. The second and third embodiments of the separator pads are identified as numerals 117 and 217 respectively.

FIGS. 3 and 4 are very similar to FIGS. 1 and 2 respectively Thus, only the differences will be briefly explained to clarify the second and third embodiments. A vehicle 100 is shown in FIG. 3 at least partially supported by a tandem axle arrangement. The left and right leaf spring assemblies 40 and 40' respectively, are identical to left and right leaf spring assemblies 4 and 4' in FIG. 1 with the exception that the main bowed leaf springs 60 and 60' have opposite ends 60A and 60B which are bent to form substantially curved ends. As shown in FIG. 4, the curved spring end 60A is received in a slot 11 in a left spring hanger 12. The left spring end 60A extends well along the length of the slot 11. The left spring hanger 12 includes a retainer pin or bolt 20 which retains the left spring end 60A in the slot il when the downward load has been removed from the left leaf spring assembly 40.

The curved right spring end 60B of the main spring leaf 60 is received in a slot 113 in a main or central spring hanger 114. In FIGS. 3 and 4, the slot 113 is formed in the central spring hanger 114 between an upper wall 115 of the central spring hanger 114 and a spring retainer bolt or pin 116. The central spring hanger 114 is connected to and extends downwardly from the frame of the vehicle 100. The spring end 60B extends well along the length of the slot 113 and sufficient clearance is provided for longitudinal movement resulting from the leaf spring assembly 40 spreading under application of a load to the spring assembly 40.

As shown in FIG. 3, the spring assembly 40 on the left side of FIG. 3 has the load removed therefrom, while the tandem leaf spring assembly 40' on the right side of FIG. 3 has a load applied thereto. With the load relieved, the left spring end 60A bears against the bottom wall of the slot 11 in the left spring hanger 12, and the right spring end 60B bears against the bottom wall of the slot 113 in the main hanger 114.

The separator pad 117 of the second embodiment is similar to the separator pad 17 of the first embodiment. Referring to FIG. 4, the separator pad 117 includes a main body 118 having integrally formed, upwardly projecting flanges 119 at or adjacent each end thereof. The main body 118 has generally planar, smooth upper and lower surfaces 118A and 118B respectively, and the flanges 119 extend upwardly from the upper surface 118A of the separator pad 117.

The separator pad 217 according to the third embodiment includes a main body 218 having generally planar, smooth upper and lower surfaces 218A and 218B respectively. The separator pad 217 includes an integrally formed, upwardly projecting flange 219A and an integrally formed, downwardly projecting flange 219B. The flanges 219A and 219B are at or adjacent the ends of the main body 218. Preferably, the upper surface 218A of the main body 218 includes a stop lip 219C at or adjacent the end of the main body 218 having the downwardly projecting flange 219B as shown in FIG. 4. The stop lip 219C is generally semi-circular in cross-section.

The separator pads 117 and 217 are positioned at each end 60A and 60B of the left leaf spring assembly 40 and at each end 60A' and 60B' of the right leaf spring assembly 40'. The separator pad of the second embodiment 117 is installed by placing the separator pad 117 between the spring end 60A and top wall of the hanger slot 11 when the load has been removed from the leaf spring assembly 40 as shown in FIG. 4. To place the separator pad 117 in its proper location, the retainer pin 20 is removed to allow the spring end 60A to be slightly lowered, thus permitting sufficient clearance between the top wall of the hanger slot 11 and the spring end 60A for the flanges 119 of the separator pad 117 to be situated such that the main body 118 of the separator pad 117 is in the slot 11 and the flanges 119 straddle the ends of the spring hanger 12. As shown in FIGS. 3 and 4, the upwardly extending flanges 119 extend above the top wall of the slot 11 after the retainer pin 20 has been reinserted. The height of the upwardly extending flanges 119 insure that the separator pad 117 will not dislocate by working its way out of the slot 11. As discussed in the first embodiment, the separator pad 117 is permitted to "float" or move for limited longitudinal distances along the spring end 60A when the vehicle is being operated. This limited longitudinal movement greatly reduces the wear and extends the life of the separator pads 117, 217.

At the opposite end 60B of the spring assembly 40, the separator pad 217 is placed between the spring end 60B and the top wall 115 of the slot 113 of the central hanger 114. The separator pad 217 is installed in a similar fashion as was the separator pad 117. At the central or main hanger 114, with the load on the spring assembly 40 relieved, the retainer pin 116 is removed to allow the spring end 60B to be slightly lowered, thus permitting sufficient clearance between the top wall 115 of the hanger slot 113 and the spring end 60B for the downwardly extending flange 219B and the stop lip 219C of the separator pad 217 to be inserted and positioned at or adjacent the extreme end of the curved spring end 60B in the central hanger 114. The upwardly extending flange 219A remains outside of the central hanger 114 and limits the longitudinal movement of the separator pad 217 into the central hanger 114 by contacting the end face of the central hanger 114. Similarly, the downwardly extending flange 219B limits the longitudinal movement of the separator pad 217 out of the central hanger 114. The height of the extending flanges 219A and 219B insure that the separator pad 217 will not dislocate by working its way out of the slot 113 during use or operation of the vehicle 100. As discussed in the previous embodiments, the separator pad 217 is permitted to "float" or move for limited longitudinal distances along the spring end 60B when the vehicle 100 is being operated.

When the load is reapplied to the spring assembly 40, it will look like the right spring assembly 40' as shown in FIG. 3. As shown in FIG. 4, the stop lip 219C may engage the top wall 115 of the central hanger 114 during operation of the vehicle 100. The stop lip 219C provides a bearing surface with the central hanger 114 and maintains the flange 219B in proper relationship with the spring end 60B. It is desirable to round off the corner where the downward extending flange 219B and the lower surface 218B of the main body 218 meet to improve the separator pad's resistance to shear failure at this location.

It has been found that separator pads that are subjected to very severe use, as for example on off-highway, heavy duty trucks, that it may be desirable, as shown in FIG. 4, to drill a hole in the flanges 119 and secure a wire cable retainer 300 to the flanges 119 through the spring hanger 12 to further secure the separator pad 117 in the slot 11.

The description given herein is intended to illustrate the preferred embodiment of the present invention. It will be apparent from the foregoing that various changes may be made in the details of construction and configuration without departing from the spirit of the invention. Therefore, it is intended that all such variations be included within the scope of the present invention as described and claimed.

We claim:

1. A method for installing a floating separator pad on a typical vehicle having a leaf spring end with said pad in direct sliding contact with an upper wall of a spring hanger of the typical vehicle, the separator pad having a main body with generally planar, smooth upper and lower surfaces and stop lips extending above the upper surface at the ends of the main body, the steps comprising:

removing the downward load on the leaf spring end so that a clearance exists between the top wall of a slot in the vehicle spring hanger and the leaf spring end while maintaining the leaf spring end in the slot;

slidably inserting the separator pad in the slot between the top wall and the leaf spring end;

positioning the separator pad relative to the vehicle spring hanger such that the stop lips limit the longitudinal movement of the separator pad along the leaf spring end; and reapplying the downward load on the leaf spring to capture the separator pad such that the lower surface of the main body is in direct sliding contact with the leaf spring end and the upper surface of the main body is in direct sliding contact with the top wall of the slot in the vehicle spring hanger.

2. The method of claim 1 wherein the separator pad is allowed to move longitudinally during use to the extent that one of the stop lips engages the spring hanger.

3. A method for installing a floating separator pad on a typical vehicle having a leaf spring end with said pad in direct sliding contact with an upper wall of a spring hanger of the typical vehicle, the separator pad having a main body with generally planar, smooth upper and lower surfaces and flanges extending from the main body at the ends thereof, the steps comprising:

removing the downward load on the leaf spring end;

removing a retainer bolt which permits downward movement of the leaf spring end from the vehicle spring hanger;

forming a clearance between the top wall of a slot in the vehicle spring hanger and the leaf spring end such that a flanged end of the separator pad is permitted to be inserted through the clearance;

inserting a flanged end of the separator pad in the clearance between the top wall of the slot and the leaf spring end;

reducing the clearance between the top wall of the slot and the leaf spring end;

replacing the retainer bolt in the vehicle spring hanger;

positioning the separator pad relative to the vehicle spring hanger such that the flanges limit the longitudinal movement of the separator pad along the leaf spring end; and reapplying the downward load on the leaf spring end to capture the separator pad such that the lower surface of the main body is in direct sliding contact with the leaf spring end and the upper surface of the main body is in direct sliding contact with the top wall of the slot in the vehicle spring hanger.

4. The method of claim 3 wherein the separator pad is allowed to move longitudinally during use to the extent that one of the flanges engages the spring hanger.

5. The method of claim 4 wherein the flanges extend from the upper surface of the main body.

6. The method of claim 3 wherein the separator pad is allowed to move longitudinally during use to the extent that one of the flanges engages either the spring hanger or the spring end.

7. The method of claim 6 wherein one flange extends from the upper surface and one flange extends from the lower surface.

8. A pad for improving ride characteristics and minimizing wear of a typical vehicle having a leaf spring end with said pad in direct sliding contact with an upper wall of a spring hanger attached to a frame of the typical vehicle, the spring hanger having a spring slot defined by an upper wall and a lower wall and the leaf spring end being free to move longitudinally a limited distance within the slot, the pad comprising:

a main body having generally planar upper and lower surfaces, said main body slidably positioned in the slot in the spring hanger between the upper wall of the slot and the leaf spring end; and means for limiting the longitudinal movement of said main body in the slot and for retaining said main body between the upper wall of the spring hanger and the leaf spring end, said limiting means at at least one end of said main body, wherein said pad is in direct sliding contact with the upper wall of the vehicle spring hanger.

9. The pad of claim 8, wherein said upper and lower surfaces of said main body are smooth surfaces.

10. The pad of claim 9, wherein the leaf spring end is free to move with respect to said main body and said main body is free to move with respect to the spring hanger.

11. The pad of claim 9, wherein said limiting means comprises:

a stop lip projecting upwardly from each end of said main body, said stop lips being spaced apart a distance greater than the length of the spring slot in the spring hanger;

wherein the spacing of said stop lips allows the pad to longitudinally move a limited distance before one of said stop lips engages the spring hanger.

12. The pad of claim 11, wherein said main body and said limiting means are made of a plastic material having low flow characteristics under high pressure and a low coefficient of friction.

13. The pad of claim 11, wherein the combined height of said stop lip and said main body is substantially equal to the height of the slot minus the thickness of the leaf spring end.

14. The pad of claim 9, wherein said limiting means comprises:

a flange projecting upwardly from each end of said main body, said flanges being spaced apart a distance greater than the length of the spring slot in the spring hanger and the combined height of said flange and said main body is greater than the height of the slot minus the thickness of the leaf spring end;

wherein the spacing of said flanges allows the pad to longitudinally move a limited distance before one of said flanges engages the spring hanger; and wherein the leaf spring end is free to move with respect to said main body and said main body is free to move with respect to the spring hanger.

15. A plastic pad for improving ride characteristics of a vehicle and minimizing wear on an end of a vehicle leaf spring and a spring hanger attached to a frame of the vehicle, the spring hanger having a spring slot defined by an upper wall and a lower wall and the leaf spring end being fee to move longitudinally a limited distance within the slot, the pad comprising:

a main body having generally planar upper and lower surfaces, said main body positioned in the slot in the spring hanger between the upper wall of the slot and the leaf spring end, said main body in direct sliding engagement with the upper wall of the slot and the leaf spring end; and a stop lip projecting upwardly from each end of said main body, said stop lips being spaced apart a distance greater than the length of the spring slot in the spring hanger;

wherein the spacing of said stop lips allows the pad to longitudinally move a limited distance before one of said stop lips engages the spring hanger.

16. A plastic pad for improving ride characteristics of a vehicle and minimizing wear on an end of a vehicle leaf spring and a spring hanger attached to a frame of the vehicle, the spring hanger having a spring slot defined by an upper wall and a lower wall and the leaf spring end being free to move longitudinally a limited distance within the slot, the pad comprising:

a main body having generally planar upper and lower surfaces, said main body positioned in the slot in the spring hanger between the upper wall of the slot and the leaf spring end;

an upwardly projecting flange extending from a first end of said main body and situated outside of the spring hanger and;

a downwardly projecting flange extending from a second end of said main body and situated inside of the spring hanger;

wherein the spacing of said flanges allows the pad to longitudinally move a limited distance.

17. The pad of claim 16 wherein the longitudinal distance that the pad is allowed to move is limited in one direction by said upwardly projecting flange contacting the spring hanger and in the other direction by said downwardly projecting flange contacting the leaf spring end.

18. The pad of claim 17 wherein the leaf spring end is free to move with respect to said main body and said main body is free to move with respect to the spring hanger.

19. The pad of claim 16 wherein the combined height of said downwardly projecting flange and said main body is greater than the height of the slot minus the thickness of the leaf spring end.

20. A pad for improving ride characteristics of a vehicle and minimizing wear on an end of a vehicle leaf spring and a spring hanger attached to a frame of the vehicle, the spring hanger having a spring slot defined by an upper wall and a lower wall and the leaf spring end being free to move longitudinally a limited distance within the slot, the pad comprising:

a main body having generally smooth, planar upper and lower surfaces, said main body positioned in the slot in the spring hanger between the upper wall of the slot and the leaf spring end;

means for limiting the longitudinal movement of said main body in the slot and for retaining said main body between the upper wall and the leaf spring end, wherein said limiting means is at at least one end of said main body and comprises:

an upwardly projecting flange extending from a first end of said main body and situated outside of the spring hanger; and a downwardly projecting flange extending from a second end of said main body and situated inside of the spring hanger, wherein the spacing of said flanges allows the pad to longitudinally move a limited distance.

21. The pad of claim 20 wherein the longitudinal distance that the pad is allowed to move is limited in one direction by said upwardly projecting flange contacting the spring hanger and in the other direction by said downwardly projecting flange contacting the leaf spring end.

22. The pad of claim 21 wherein the leaf spring end is free to move with respect to said main body and said main body is fee to move with respect to the spring hanger.

23. The pad of claim 20 wherein the combined height of said downwardly projecting flange and said main body is greater than the height of the slot minus the thickness of the leaf spring end.

* * * * *